(12) United States Patent
Mishina et al.

(10) Patent No.: US 10,323,947 B2
(45) Date of Patent: Jun. 18, 2019

(54) TRAVEL CONTROL METHOD AND TRAVEL CONTROL APPARATUS

(71) Applicant: Nissan Motor Co., Ltd., Yokohama-shi, Kanagawa (JP)

(72) Inventors: Yohei Mishina, Kanagawa (JP); Abdelaziz Khiat, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 15/748,950

(22) PCT Filed: Jul. 31, 2015

(86) PCT No.: PCT/JP2015/071818
§ 371 (c)(1),
(2) Date: Jan. 30, 2018

(87) PCT Pub. No.: WO2017/022019
PCT Pub. Date: Feb. 9, 2017

(65) Prior Publication Data
US 2018/0347990 A1 Dec. 6, 2018

(51) Int. Cl.
*G01C 21/30* (2006.01)
*G01C 21/28* (2006.01)
(Continued)

(52) U.S. Cl.
CPC .............. *G01C 21/30* (2013.01); *B60W 30/12* (2013.01); *G01C 21/28* (2013.01); *G01S 13/02* (2013.01);
(Continued)

(58) Field of Classification Search
CPC ...... G01C 21/30; G01S 19/48; G06K 9/00798
See application file for complete search history.

(56) References Cited

U.S. PATENT DOCUMENTS

2006/0293843 A1  12/2006  Morita et al.
2007/0021912 A1   1/2007  Morita et al.
(Continued)

FOREIGN PATENT DOCUMENTS

EP      1674827 A1    6/2006
JP   2007178383 A    7/2007
(Continued)

*Primary Examiner* — Yuen Wong
(74) *Attorney, Agent, or Firm* — Young Basile Hanlon & MacFarlane, P.C.

(57) ABSTRACT

A travel control method includes estimating the position of a subject vehicle on the basis of a detection result of a first detector, detecting a lane in which the subject vehicle travels, on the basis of a detection result of a second detector, determining that whether the position of the subject vehicle based on the positional information is included in the lane and outputting the determination as a first determination result, and determining that whether the position of the subject vehicle estimated on the basis of the detection result of the first detector is included in the lane and outputting the determination as a second determination result, and a step of performing a position estimation process of estimating the position of the subject vehicle on the basis of the detection result of the first detector when the first determination result and the second determination result are not identical.

8 Claims, 9 Drawing Sheets

(51) Int. Cl.
    *G08G 1/0968*     (2006.01)
    *B60W 30/12*     (2006.01)
    *G01S 19/47*     (2010.01)
    *G01S 13/02*     (2006.01)
    *G01S 13/86*     (2006.01)
    *G06K 9/00*     (2006.01)
    *G01S 19/48*     (2010.01)
    *G01S 19/40*     (2010.01)
    *G01S 19/49*     (2010.01)
    *G08G 1/16*     (2006.01)
    *G01S 13/93*     (2006.01)

(52) U.S. Cl.
    CPC .............. *G01S 13/86* (2013.01); *G01S 19/40* (2013.01); *G01S 19/47* (2013.01); *G01S 19/48* (2013.01); *G01S 19/49* (2013.01); *G06K 9/00798* (2013.01); *G08G 1/0968* (2013.01); *G01S 13/931* (2013.01); *G01S 2013/9375* (2013.01); *G01S 2013/9378* (2013.01); *G01S 2013/9385* (2013.01); *G08G 1/167* (2013.01)

(56) References Cited

U.S. PATENT DOCUMENTS

| | | |
|---|---|---|
| 2007/0225907 A1 | 9/2007 | Oonishi et al. |
| 2010/0121518 A1 | 5/2010 | Tiernan et al. |
| 2010/0299063 A1 | 11/2010 | Nakamura et al. |
| 2011/0169958 A1 | 7/2011 | Imai et al. |
| 2018/0172455 A1* | 6/2018 | Yamaguchi ............ G01C 21/30 |

FOREIGN PATENT DOCUMENTS

| | | |
|---|---|---|
| JP | 2008298699 A | 12/2008 |
| JP | 2009257900 A | 11/2009 |
| JP | 2010271155 A | 12/2010 |
| JP | 2011012965 A | 1/2011 |
| JP | 2014115247 A | 6/2014 |

* cited by examiner

TRAVEL CONTROL METHOD AND TRAVEL CONTROL APPARATUS

TECHNICAL FIELD

The present invention relates to a travel control method executed by a travel control apparatus that controls travel of a vehicle and also to the travel control apparatus.

BACKGROUND

A technique has been conventionally known which includes detecting the position of a subject vehicle on the basis of an image captured by a camera and correcting the detected position of the subject vehicle on the basis of a measurement result obtained using the global positioning system (GPS) (see Japanese Application Publication No. JP2014-115247A).

In the above conventional technique, the measurement value obtained using the GPS may significantly vary in some cases, such as when the GPS switches satellites, and an erroneous determination may be made that a lane in which the subject vehicle does not actually travel is recognized as the lane in which the subject vehicle travels.

SUMMARY

The present invention solves the above problem through outputting a first determination result as to whether or not the position of a subject vehicle based on the positional information received by a receiver is included in a lane in which the subject vehicle travels, outputting a second determination result as to whether the position of the subject vehicle estimated on the basis of the detection result of a detector for detecting a state of the subject vehicle is included in the lane in which the subject vehicle travels, and estimating the position of the subject vehicle on the basis of the detection result of the detector when the first determination result and the second determination result are not identical.

The present invention can provide a control method executed by a travel control apparatus that can appropriately estimate the position of the subject vehicle.

DETAILED DESCRIPTION OF THE EMBODIMENTS

Hereinafter, one or more embodiments of the present invention will be described with reference to the drawings. In the embodiments, a travel control apparatus equipped in a vehicle will be exemplified and described.

«First Embodiment»

Figure 1:
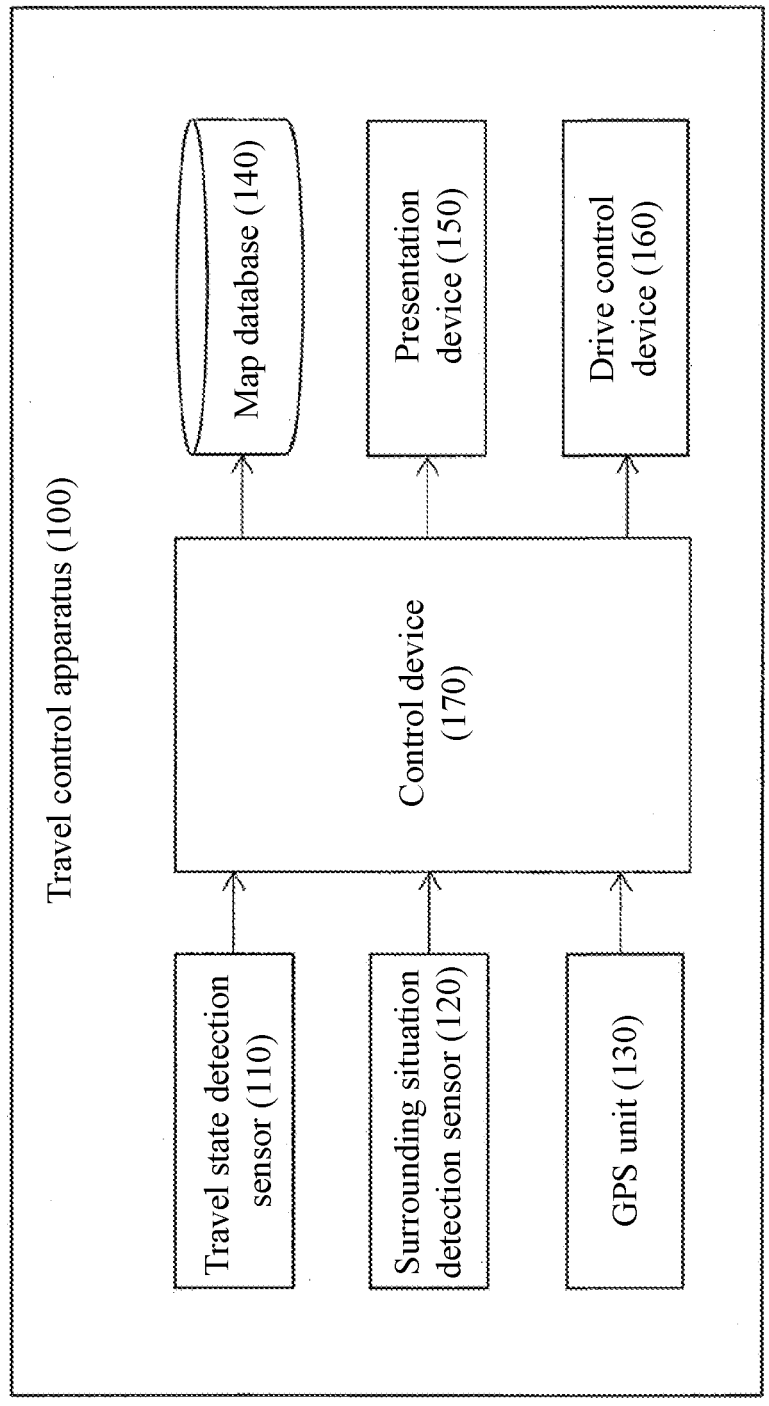
FIG. 1 is a block diagram illustrating the configuration of a travel control apparatus according to one or more embodiments of the present invention.

FIG. 1 is a block diagram illustrating the configuration of a travel control apparatus 100 according to the present embodiment. As illustrated in FIG. 1, the travel control apparatus 100 according to the present embodiment has a travel state detection sensor 110, a surrounding situation detection sensor 120, a GPS unit 130, a map database 140, a presentation device 150, a drive control device 160, and a control device 170. These devices are connected by a controller area network (CAN), other in-vehicle LAN and the like for mutually exchanging information.

The travel state detection sensor 110 has a vehicle speed sensor that detects the vehicle speed of the subject vehicle and a gyro-sensor that detects the acceleration of the subject vehicle. The travel state detection sensor 110 detects the vehicle speed of the subject vehicle using the vehicle speed sensor and detects the acceleration and travel direction of the subject vehicle using the gyro-sensor. Travel information of the subject vehicle detected by the travel state detection sensor 110 is output to the control device 170.

The surrounding situation detection sensor 120 has at least one of a front camera that captures images ahead of the subject vehicle, a rear camera that captures images behind the subject vehicle, a front radar that detects obstacles ahead of the subject vehicle, a rear radar that detects obstacles behind the subject vehicle, and side radars that detect obstacles existing at sides of the subject vehicle. The surrounding situation detection sensor 120 detects surrounding information that represents the situation around the subject vehicle. The surrounding information of the subject vehicle detected by the surrounding situation detection sensor 120 is output to the control device 170.

The GPS unit 130 detects radio waves transmitted from a plurality of communication satellites to periodically acquire positional information of the subject vehicle. The positional information of the subject vehicle detected by the GPS unit 130 is output to the control device 170.

The map database 140 stores map information including road information. The road information includes information on lanes of each road.

The presentation device 150 is, for example, a device such as a display of a navigation device, a display incorporated in a rearview mirror, a display incorporated in a meter unit, a head-up display projected on a windshield, and a speaker of an audio device. The presentation device 150 presents some presentation information to the driver under the control by the control device 170.

The drive control device 160 controls travel of the subject vehicle. For example, when the subject vehicle follows a preceding vehicle, the drive control device 160 controls the operation of a drive mechanism (which includes the operation of an internal-combustion engine in the case of an engine car and the operation of an electric motor in the case of an electric car and further includes the torque distribution between an internal-combustion engine and an electric motor in the case of a hybrid car) and the braking operation to achieve the acceleration, deceleration and vehicle speed so that the distance between the subject vehicle and the preceding vehicle is maintained at a constant distance. When the subject vehicle performs lane change and/or right turn or left turn, the drive control device 160 controls the operation of a steering actuator to control the operation of wheels and thereby executes the turning control of the subject vehicle. The drive control device 160 controls travel of the subject vehicle in accordance with commands from the control device 170 which will be described below. Other well-known methods can also be used as a travel control method executed by the drive control device 160.

The control device 170 includes a read only memory (ROM) that stores programs for controlling travel of the subject vehicle, a central processing unit (CPU) that executes the programs stored in the ROM, and a random access memory (RAM) that serves as an accessible storage device. As substitute for or in addition to the CPU, a micro processing unit (MPU), digital signal processor (DSP), application specific integrated circuit (ASIC), field programmable gate array (FPGA), or the like can also be used as an operational circuit.

The control device 170 executes the programs stored in the ROM using the CPU thereby to execute a GPS position estimation function for estimating the position of the subject vehicle on the basis of the measurement result of the GPS unit 130, an odometry position estimation function for estimating the position of the subject vehicle on the basis of the detection result of the travel state detection sensor 110, a boundary line detection function for detecting boundary lines of a lane in which the subject vehicle travels, a subject vehicle position evaluation function for evaluating the position of the subject vehicle, and a subject vehicle position determination function for determining the position of the subject vehicle on the basis of the evaluation result. Each function of the control device 170 will be described below.

The control device 170 executes the GPS position estimation function to estimate the position of the subject vehicle on the basis of the measurement result of the GPS unit 130. The control device 170 corrects the positional information of the subject vehicle acquired by the GPS unit 130, on the basis of the angle variation information acquired from the gyro-sensor and the vehicle speed acquired from the vehicle speed sensor. In the following description, the position of the subject vehicle estimated using the GPS position estimation function will be referred to as a "GPS estimation position."

The control device 170 executes the odometry position estimation function to estimate the position of the subject vehicle on the basis of the detection result of the travel state detection sensor 110. For example, The control device 170 calculates a position variation amount of the subject vehicle on the basis of the vehicle speed detected by the vehicle speed sensor and the acceleration and angle speed detected by the gyro-sensor. Then, the control device 170 estimates the current position of the subject vehicle by adding the currently-calculated position variation amount of the subject vehicle to the previously-estimated position of the subject vehicle. In the following description, the position of the subject vehicle estimated using the odometry position estimation function will be referred to as an "odometry estimation position."

The control device 170 executes the boundary line detection function to detect boundary lines of the lane in which the subject vehicle travels (this lane will be also referred to as a "subject vehicle lane," hereinafter) as lane boundary lines. For example, the control device 170 detects lane marks of the lane in which the subject vehicle travels and boundary lines between road shoulders and the lane in which the subject vehicle travels as the lane boundary lines on the basis of image data captured by the front camera and/or the rear camera, which constitute the surrounding situation detection sensor 120, or the detection result detected by the front radar, rear radar, or side radars, which also constitute the surrounding situation detection sensor 120. Details of a method of detecting the lane boundary lines using the boundary line detection function will be described later.

The control device 170 executes the subject vehicle position evaluation function to evaluate the position of the subject vehicle on the basis of the GPS estimation position estimated using the GPS position estimation function and the odometry estimation position estimated using the odometry position estimation function. A method of evaluating the position of the subject vehicle using the subject vehicle position evaluation function will also be described later.

The control device 170 executes the subject vehicle position determination function to determine the position of the subject vehicle on the basis of the evaluation result obtained using the subject vehicle position evaluation function. A method of determining the position of the subject vehicle using the subject vehicle position determination function will also be described later.

Figure 2:
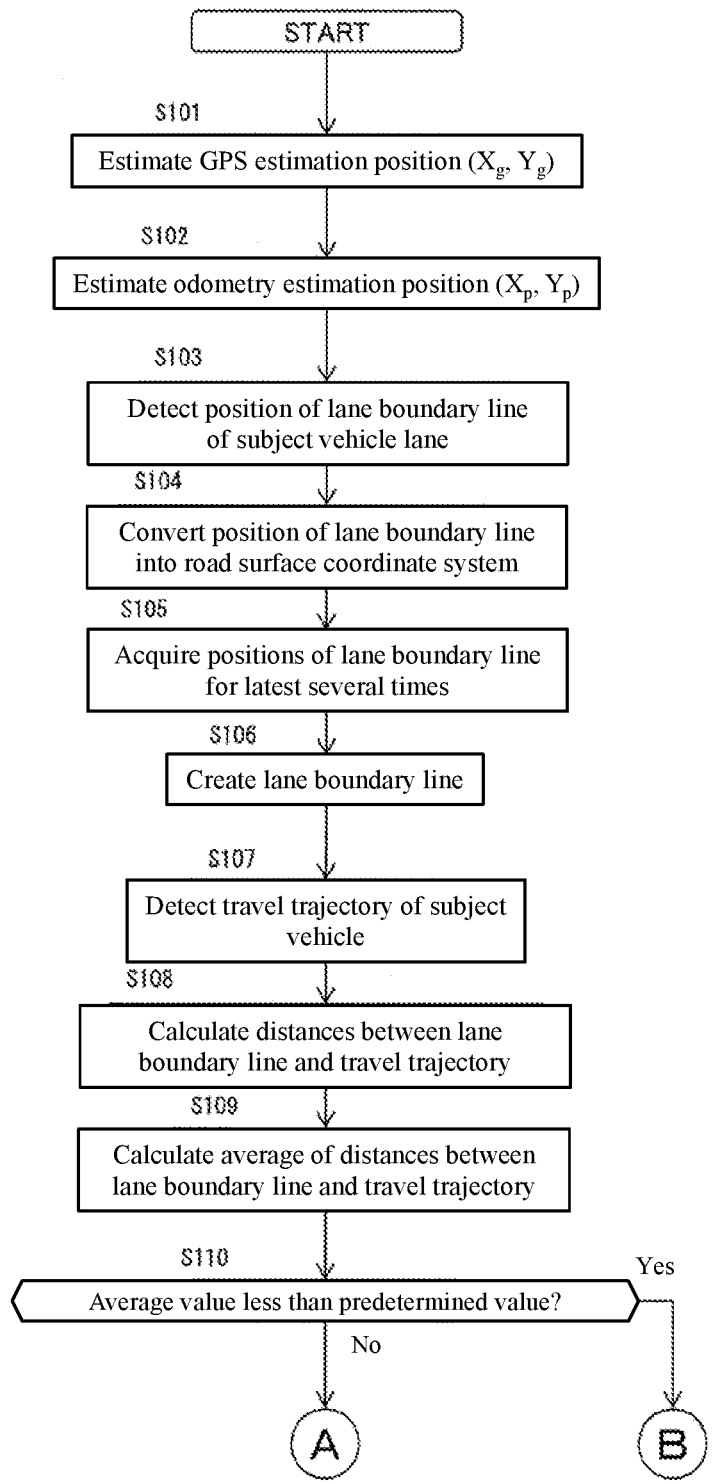
FIG. 2 is a flowchart (part 1) illustrating a travel control process according to a first embodiment of the present invention.
Figure 3:
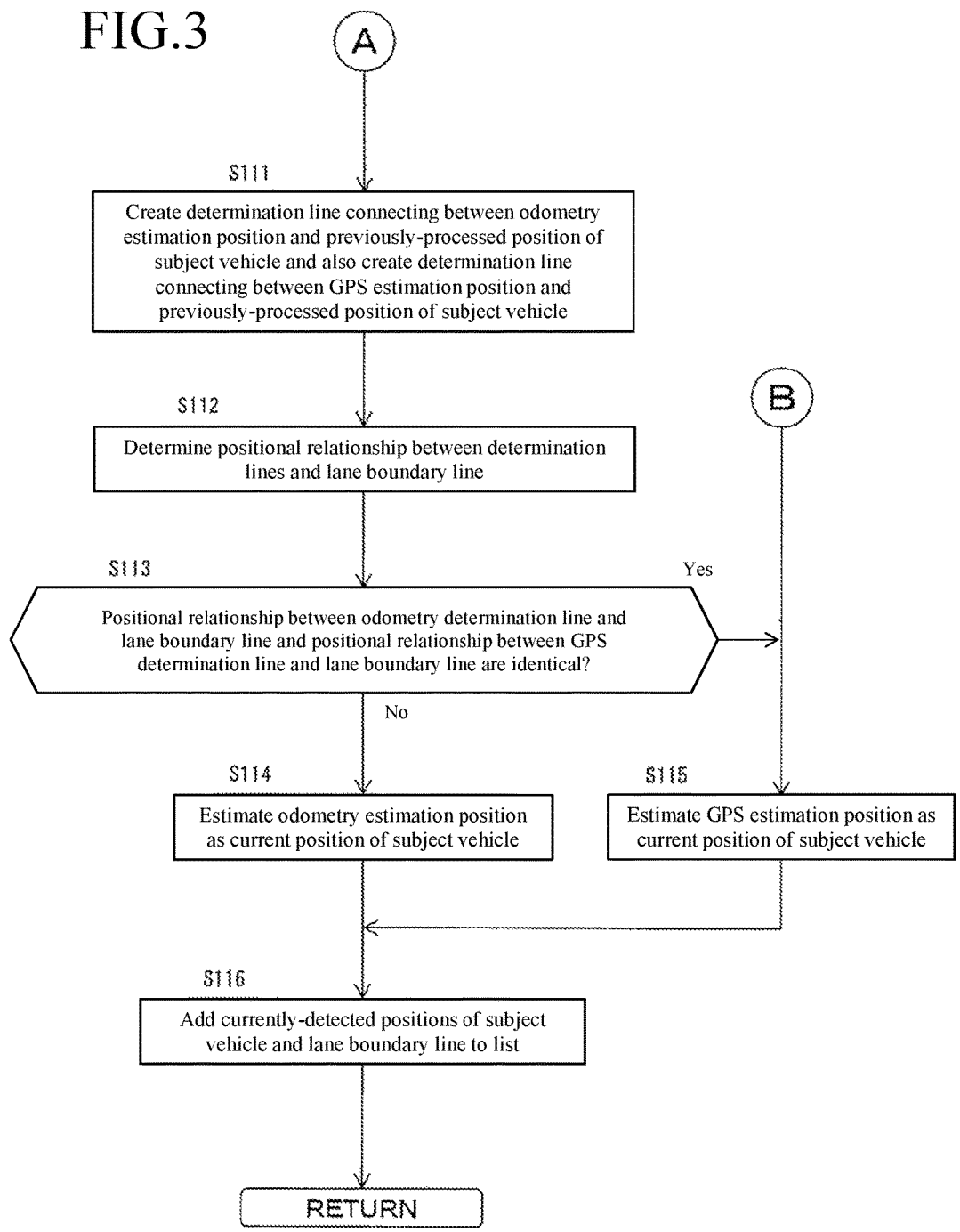
FIG. 3 is a flowchart (part 2) illustrating the travel control process according to the first embodiment.

A travel control process according to the first embodiment will now be described with reference to FIG. 2 and FIG. 3. FIG. 2 and FIG. 3 are flowcharts illustrating the travel control process according to the first embodiment. The travel control process described below is executed by the control device 170.

In step S101, the GPS position estimation function is executed to estimate the current position of the subject vehicle as the GPS estimation position on the basis of the measurement result of the GPS unit 130.

Figure 4:
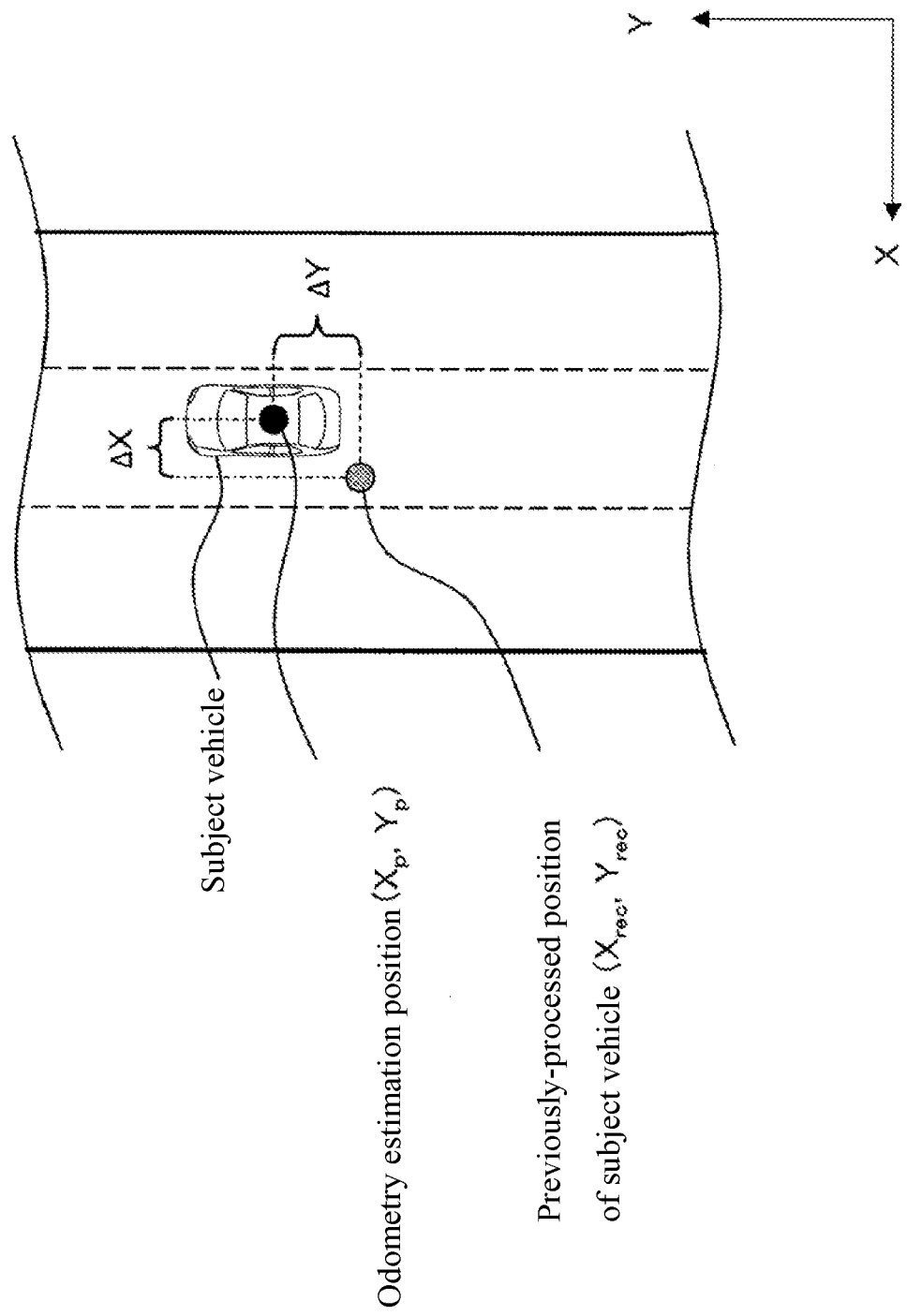
FIG. 4 is a view for describing a method of estimating an odometry estimation position.

In step S102, the odometry position estimation function is executed to estimate the current position of the subject vehicle as the odometry estimation position on the basis of the detection result of the travel state detection sensor 110. For example, as illustrated in FIG. 4, the odometry position estimation function is executed to calculate a position variation amount ($\Delta x$, $\Delta y$, $\Delta \theta$) of the subject vehicle from the time of the previous process on the basis of the detection result of the travel state detection sensor 110. The odometry position estimation function is also executed to acquire positional information (Xrec, Yrec) of the subject vehicle at the time of the previous process from the memory of the control device 170, as illustrated in FIG. 4. The odometry position estimation function is then executed to estimate the current position (Xp, Yp) of the subject vehicle as the odometry estimation position on the basis of the positional information (Xrec, $Y_{rec}$) of the subject vehicle at the time of the previous process and the position variation amount ($\Delta x$, $\Delta y$, $\Delta \theta$) of the subject vehicle from the previous process in accordance with the following equations (1) and (2). FIG. 4 is a view for describing a method of estimating the odometry estimation position.

$$X_p = X_{rec} + \Delta x \quad (1)$$

$$Y_p = Y_{rec} + \Delta y \quad (2)$$

Figure 5A:
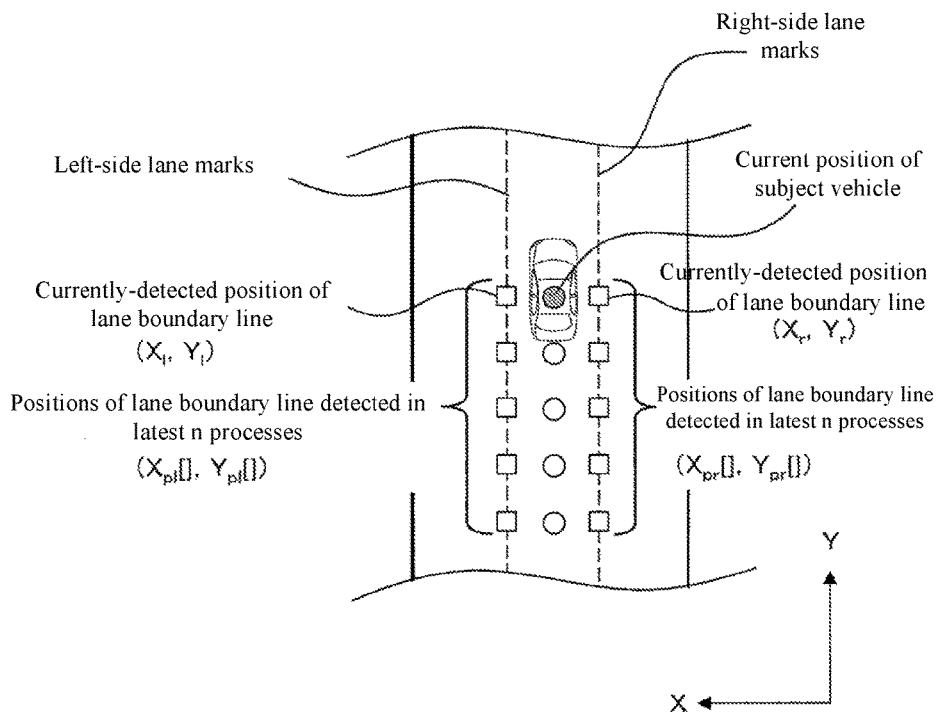
FIGS. 5A and 5B are views for describing a method of detecting lane boundary lines.
Figure 5B:
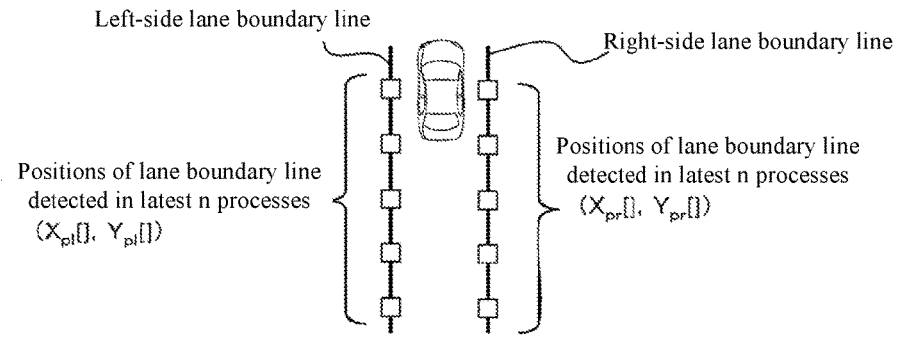
Figure 6:
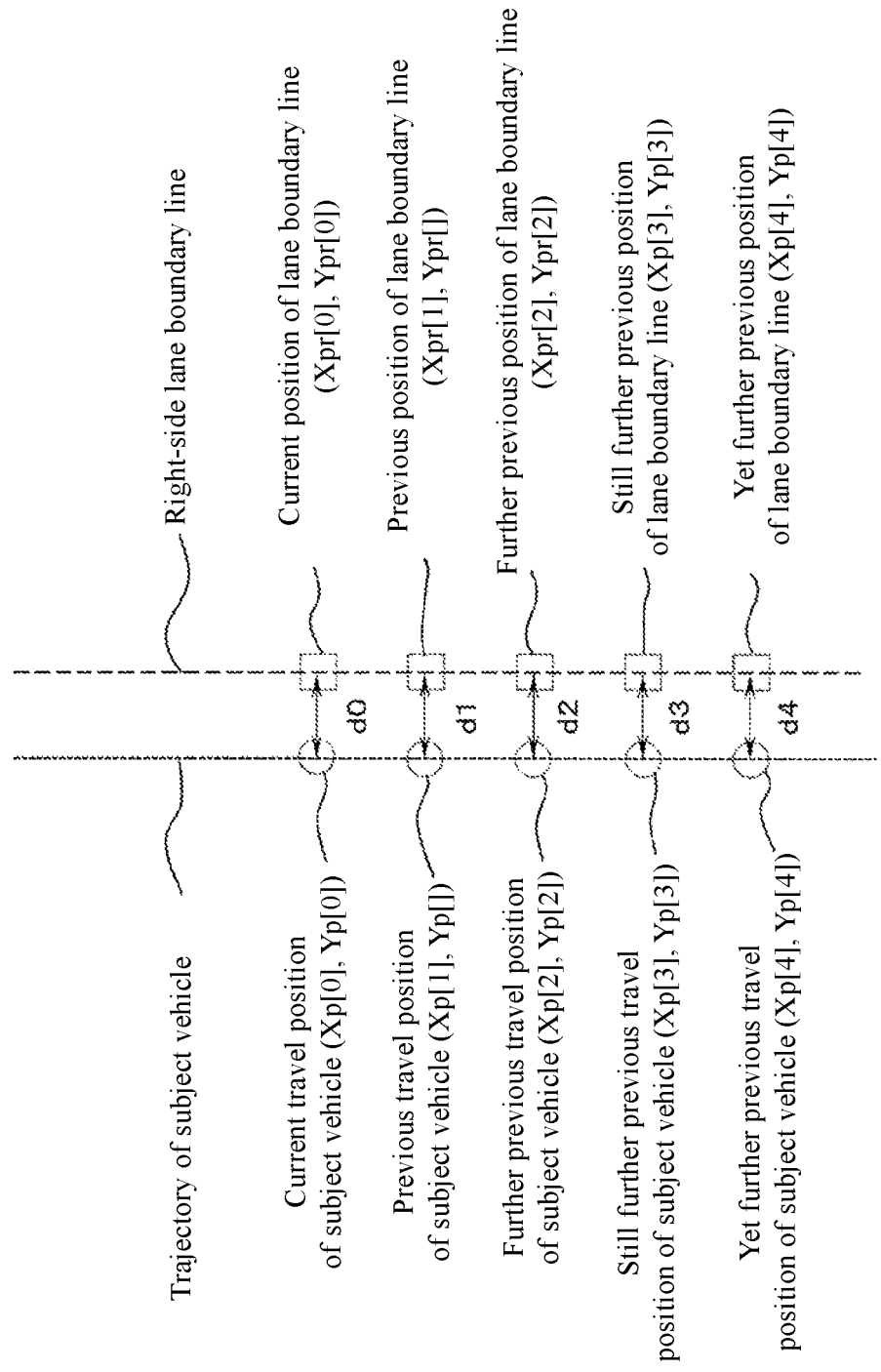
FIG. 6 is a view for describing a method of determining whether the subject vehicle gets across a lane boundary line.

In step S103, the boundary line detection function is executed to detect positions of lane boundary lines of the lane (subject vehicle lane) in which the subject vehicle travels. For example, the boundary line detection function is executed to acquire the image information around the subject vehicle and/or detection results from the surrounding situation detection sensor 120 and detect positions of lane marks at the right and left sides of the subject vehicle or positions of lane boundary lines between the road and the road shoulders. FIGS. 5A and 5B illustrate a scene in which lane marks exist at the right and left sides of the subject vehicle. For example, the boundary line detection function is executed to detect positions $(X_l, Y_l)$ and $(X_r, Y_r)$ on the lane marks at the sides of the subject vehicle, as illustrated in FIGS. 5A and 5B. Here, $X_l$ and $Y_l$ represent the position of a lane mark at the left side of the subject vehicle and $X_r$ and $Y_r$ represent the position of a lane mark at the right side of the subject vehicle.

In step S104, the boundary line detection function is executed to convert the lane boundary line positions detected in step S103 from a vehicle coordinate system to a road surface coordinate system. This will be more specifically described. A set of the lane boundary line positions (Xl, Yl, Xr, Yr) detected in step S103 is positioned in the vehicle coordinate system with the position of the vehicle (camera) as the origin coordinate. In step S104, this set of positions (Xl, Yl, Xr, Yr) is converted from the vehicle coordinate system, in which the current position of the subject vehicle is the origin coordinate (0, 0), to the road surface coordinate system, in which the current position of the subject vehicle is expressed as (Xp, Yp). In the following description, (Xl_r, Yl_r, Xr_r, Yr_r) represents a set of positions obtained by changing the set of lane boundary line positions (Xl, Yl, Xr, Yr) in the vehicle coordinate system into the road surface coordinate system.

The set of lane boundary line positions (Xl_r, Yl_r, Xr_r, Yr_r) converted into the road surface coordinate system in step S104 is added to a list of lane boundary line positions stored in the memory of the control device 170. In this list, plural sets of lane boundary line positions (Xl_r, Yl_r, Xr_r, Yr_r) detected in the latest n processes (including the current process) are registered. In the following description, (Xpl[ ], Ypl[ ], Xpr[ ], Ypr[ ]) represents the sets of lane boundary line positions which are registered in the list for the latest n times.

In step S105, the boundary line detection function is executed to acquire the sets of lane boundary line positions (Xpl[ ], Ypl[ ], Xpr[ ], Ypr[ ]) detected in the latest n processes. As described above, the boundary line detection function can be executed to refer to the list of lane boundary line positions stored in the memory of the control device 170 thereby to acquire the sets of lane boundary line positions (Xpl[ ], Ypl[ ], Xpr[ ], Ypr[ ]) detected in the latest n processes.

In step S106, the boundary line detection function is executed to detect lane boundary lines of the subject vehicle lane on the basis of the sets of lane boundary line positions (Xpl[ ], Ypl[ ], Xpr[ ], Ypr[ ]) acquired in step S105 for the latest n times. For example, the boundary line detection function can be used to calculate regression curves from the sets of lane boundary line positions (Xpl[ ], Ypl[ ], Xpr[ ], Ypr[ ]) for the latest n times thereby to detect the calculated regression curves as the lane boundary lines of the subject vehicle lane. The boundary line detection function is also executed to detect the left-side lane boundary line from positions of the left-side lane boundary line and detect the right-side lane boundary line from positions of the right-side lane boundary line.

In step S107, the subject vehicle position evaluation function is executed to detect a travel trajectory of the subject vehicle. In the present embodiment, like the sets of the lane boundary line positions, subject vehicle positions (Xp, Yp) detected in the latest n processes are also stored as a list in the memory of the control device 170. The subject vehicle position evaluation function can be used to refer to the list of the subject vehicle positions to calculate a regression curve from the subject vehicle positions detected in the latest n processes, thereby detecting the calculated regression curve as the travel trajectory of the subject vehicle. In the following description, (Xp[ ], Yp[ ]) represents the subject vehicle positions for the latest n times.

In step S 108, the subject vehicle position evaluation function is executed to calculate distances from the lane boundary lines of the subject vehicle lane detected in step S106 to the travel trajectory of the subject vehicle detected in step S 107. For example, the subject vehicle position evaluation function is executed to detect a distance d0 between each of the right and left lane boundary line positions (Xpl[0], Ypl[0], Xpr[0], Ypr[0]) and the travel trajectory position (Xp[0], Yp[0]) which are detected in the current process. The subject vehicle position evaluation function is also used to detect a distance d1 between each of the right and left lane boundary line positions (Xpl[1], Ypl[1], Xpr[1], Ypr[1]) and the travel trajectory position (Xp[1], Yp[1]) which are detected in the previous process. Similarly, the subject vehicle position evaluation function can be used to detect distances d2 to d(n−1) between the right and left lane boundary line positions and the travel trajectory positions which are detected in the latest n processes.

In step S109, the subject vehicle position evaluation function is executed to calculate an average value of the distances, which are calculated in step S108, from each lane boundary line to the travel trajectory of the subject vehicle. Then, in step S110, the subject vehicle position evaluation function is executed to determine whether or not the average value of the distances, which are calculated in step S108, from the lane boundary line to the travel trajectory of the subject vehicle is less than a predetermined value. Here, when the subject vehicle gets across the lane boundary line, the average value of the distances from the travel trajectory of the subject vehicle to the lane boundary line is close to zero at time points before and after the subject vehicle gets across the lane boundary line. As such, when the average value of the distances from the travel trajectory of the subject vehicle to the lane boundary line is less than the predetermined value, the control device 170 determines that the subject vehicle gets across the lane boundary line and the routine proceeds to step S115 illustrated in FIG. 3. On the other hand, when the average value of the distances from the travel trajectory of the subject vehicle to the lane boundary line is not less than the predetermined value, the control device 170 determines that the subject vehicle does not get across the lane boundary line and the routine proceeds to step S111 illustrated in FIG. 3.

Figure 7A:
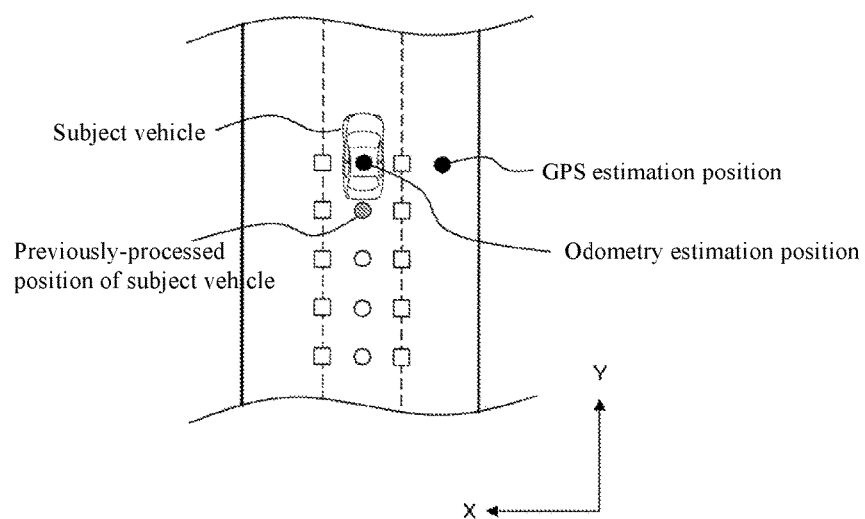
FIGS. 7A-7C are views for describing the positional relationships between determination lines and a lane boundary line.
Figure 7B:
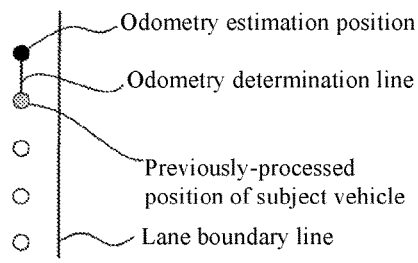
Figure 7C:
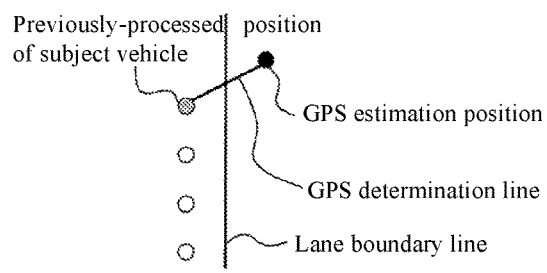

In step S111, the subject vehicle position evaluation function is executed to generate a determination line that connects between the current position of the subject vehicle estimated in the current process and the position of the subject vehicle detected in the previous process. In the present embodiment, as illustrated in FIG. 7A, the odometry estimation position based on the detection result of the travel state detection sensor 110 and the GPS estimation position based on the measurement result of the GPS unit 130 are each estimated as the current position of the subject vehicle. As illustrated in FIG. 7B, therefore, the subject vehicle position evaluation function is executed to generate a determination line that connects between the odometry estimation position and the position of the subject vehicle detected in the previous process as an odometry determination line. In addition, as illustrated in FIG. 7C, the subject vehicle position evaluation function is executed to generate a determination line that connects between the GPS estimation position and the position of the subject vehicle detected in the previous process as a GPS determination line.

In step S112, the subject vehicle position evaluation function is executed to determine the positional relationships between the determination lines generated in step S111 and the lane boundary line. Specifically, the subject vehicle position evaluation function is executed to determine whether or not the determination lines cross the lane boundary line. For example, in the example illustrated in FIGS. 7A-7C, the control device 170 determines that the odometry determination line based on the detection result of the travel state detection sensor 110 does not cross the lane boundary line, as illustrated in FIG. 7B. On the other hand, as illustrated in FIG. 7C, the control device 170 determines that the GPS determination line based on the measurement result of the GPS unit 130 crosses the lane boundary line.

In step S113, the subject vehicle position evaluation function is executed to determine whether or not the determination result of the positional relationship between the odometry determination line and the lane boundary line and the determination result of the positional relationship between the GPS determination line and the lane boundary line are identical. These determination results are determined in step S112. For example, when a determination is made that both the GPS determination line and the odometry determination line cross the lane boundary line or when a determination is made that both the GPS determination line and the odometry determination line do not cross the lane boundary line, the subject vehicle position evaluation function is executed to determine that the determination result of the positional relationship between the odometry determination line and the lane boundary line and the determination result of the positional relationship between the GPS determination line and the lane boundary line are identical. Then, when the determination result of the positional relationship between the odometry determination line and the lane boundary line and the determination result of the positional relationship between the GPS determination line and the lane boundary line are identical, the routine proceeds to step S115. On the other hand, when the determination result of the positional relationship between the odometry determination line and the lane boundary line and the determination result of the positional relationship between the GPS determination line and the lane boundary line are not identical, the routine proceeds to step S114. For example, in the example illustrated in FIGS. 7A-7C, the odometry determination line based on the detection result of the travel state detection sensor 110 does not cross the lane boundary line as illustrated in FIG. 7B while the GPS determination line based on the measurement result of the GPS unit 130 crosses the lane boundary line as illustrated in FIG. 7C. The subject vehicle position evaluation function is therefore executed to determine that the determination result of the positional relationship between the odometry determination line and the lane boundary line and the determination result of the positional relationship between the GPS determination line and the lane boundary line are not identical, and the routine proceeds to step S114.

In step S115, the subject vehicle position determination function is executed to determine the GPS estimation position based on the measurement result of the GPS unit 130 as the current position of the subject vehicle. Specifically, the subject vehicle position determination function is executed to set the GPS position (Xg, Yg) based on the measurement result of the GPS unit 130 as the current position (Xrec, Yrec) of the subject vehicle. Thus, when the control device 170 determines that both the position of the subject vehicle based on the detection result of the travel state detection sensor 110 and the position of the subject vehicle based on the measurement result of the GPS unit 130 are within the same lane, the GPS estimation position is employed as the current position of the subject vehicle.

On the other hand, when the control device 170 determines that, as illustrated in FIGS. 7B and 7C, the positional relationship between the odometry determination line and the lane boundary line and the positional relationship between the GPS determination line and the lane boundary line are not identical, the routine proceeds to step S114. In step S114, the subject vehicle position determination function is executed to determine the odometry estimation position based on the detection result of the travel state detection sensor 110 as the positional information of the subject vehicle. Specifically, the subject vehicle position determination function is executed to set the odometry estimation position (Xp, Yp) based on the detection result of the travel state detection sensor 110 as the current position (Xrec, Yrec) of the subject vehicle. Thus, when the position of the subject vehicle based on the detection result of the travel state detection sensor 110 and the position of the subject vehicle based on the measurement result of the GPS unit 130 are within separate lanes, the odometry estimation position is employed as the current position of the subject vehicle.

In step S116, the control device 170 adds the current position (Xrec, Yrec) of the subject vehicle set in step S114 or S115 to the list of travel positions of the subject vehicle stored in the memory of the control device 170. Through this operation, when the travel trajectory of the subject vehicle is set in step S108 at the time of the next process, the positional information (Xrec, Yrec) of the subject vehicle in the current process can be used as the positional information of the subject vehicle at the time of the previous process. Similarly, the set of lane boundary line positions (Xl_r, Yl_r, Xr_r, Yr_r), which are detected in step S103 and converted into the road surface coordinate system in step S104, is added to the list of lane boundary line positions stored in the memory of the control device 170. Through this operation, when the sets of lane boundary line positions for the latest n times are acquired in step S105 at the time of the next process, the set of lane boundary line positions (Xl_r, Yl_r, Xr_r, Yr_r) at the time of the current process can be used as the set of lane boundary line positions at the time of the previous process.

When, in step S110, the control device 170 determines that the average value of the distances from the lane boundary line to the travel trajectory of the subject vehicle is less than the predetermined value, that is, when the subject vehicle gets across the lane boundary line, the routine also proceeds to step S115 in which the subject vehicle position determination function is executed to perform the process of estimating the GPS estimation position as the position of the subject vehicle. When the subject vehicle gets across the lane boundary line, if the position of the subject vehicle is estimated on the basis of the positional relationships between the determination lines and the lane boundary line, the estimation result of the position of the subject vehicle may be unstable. When the subject vehicle gets across the lane boundary line, therefore, the GPS estimation position can be used as the current position of the subject vehicle thereby to stably estimate the position of the subject vehicle.

As described above, in the first embodiment, when both the position of the subject vehicle estimated on the basis of the measurement result of the GPS unit 130 and the position of the subject vehicle estimated on the basis of the detection result of the travel state detection sensor 110 are within the same lane, the GPS estimation position based on the measurement result of the GPS unit 130 is estimated as the current position of the subject vehicle, while when both are not within the same lane, the odometry estimation position based on the detection result of the travel state detection sensor 110 is estimated as the current position of the subject vehicle. Through this operation, even when a detection error of the GPS unit 130 occurs, the position at which the subject vehicle travels can be appropriately determined at the lane level on the basis of the detection result of the travel state detection sensor 110.

Moreover, he present embodiment determines whether or not the odometry estimation position based on the detection result of the travel state detection sensor 110 gets across the lane boundary line and whether or not the GPS estimation position based on the measurement result of the GPS unit 130 gets across the lane boundary line. and determines whether or not the determination result based on the detection result of the travel state detection sensor 110 and the determination result based on the measurement result of the GPS unit 130 are identical. Thus, the present embodiment determines whether or not the position of the subject vehicle based on the detection result of the travel state detection sensor 110 and the position of the subject vehicle based on the measurement result of the GPS unit 130 are within the same lane. That is, when the determination result based on the detection result of the travel state detection sensor 110 and the determination result based on the measurement result of the GPS unit 130 are not identical, the present embodiment determines that the position of the subject vehicle based on the detection result of the travel state detection sensor 110 and the position of the subject vehicle based on the measurement result of the GPS unit 130 are not within the same lane, and the position of the subject vehicle is estimated using the detection result of the travel state detection sensor 110, in which an error is less likely occur, rather than using the measurement result of the GPS unit 130, in which an error may readily occur. Through this operation, the position at which the subject vehicle travels can be appropriately determined at the lane level.

Figure 8A:
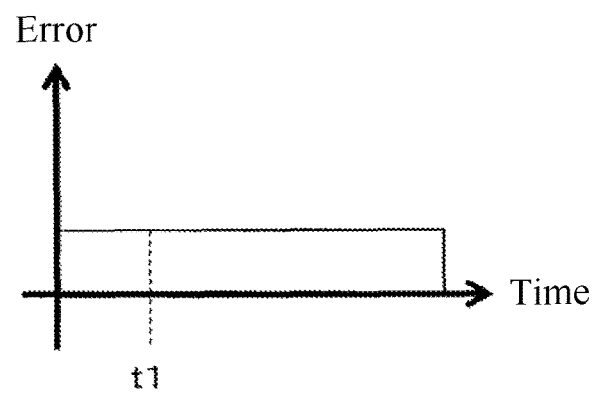
FIGS. 8A and 8B are views illustrating an example of an error of the position of the subject vehicle based on the detection result of a surrounding situation detection sensor and an example of an error of the position of the subject vehicle based on the measurement result of a GPS unit.
Figure 8B:
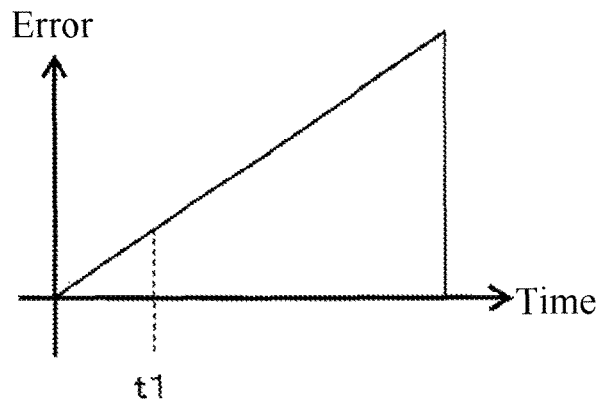
Figure 9:
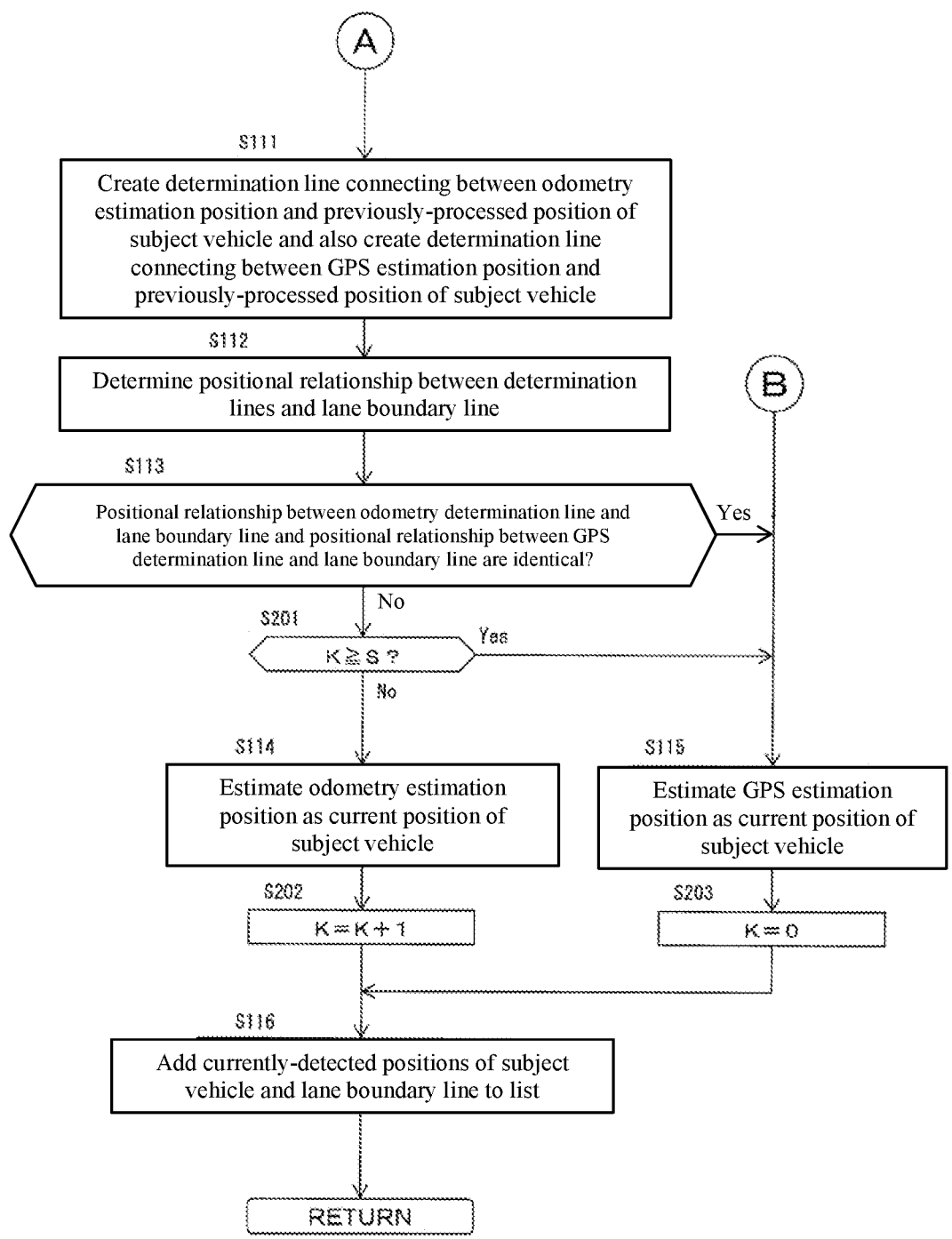
FIG. 9 is a flowchart illustrating a travel control process according to a second embodiment of the present invention.

FIG. 8A is a view illustrating an example of an error of the position of the subject vehicle based on the measurement result of the GPS unit 130 and FIG. 8B is a view illustrating an example of an error of the position of the subject vehicle based on the detection result of the travel state detection sensor 110. In FIGS. 8A and 8B, the vertical axes each represent an error between the estimated position of the subject vehicle and the actual position of the subject vehicle when repeatedly detecting the position of the subject vehicle based on the measurement result of the GPS unit 130 or the position of the subject vehicle based on the detection result of the travel state detection sensor 110. The GPS unit 130 repeats measurement of the position of the subject vehicle by repeatedly receiving radio waves transmitted from communication satellites. Accordingly, as illustrated in FIG. 8A, a constant error tends to occur in the position of the subject vehicle based on the measurement result of the GPS unit 130 independently of the elapsed time. In contrast, when the position of the subject vehicle is estimated on the basis of the detection result of the travel state detection sensor 110, the current position of the subject vehicle is estimated by adding the moving amount ($\Delta x$, $\Delta y$) moved from the previous position of the subject vehicle to the previously-estimated position of the subject vehicle. Accordingly, as illustrated in FIG. 8B, errors are accumulated as time passes and the error tends to increase in the position of the subject vehicle based on the detection result of the travel state detection sensor 110. However, fortunately, the error of the position of the subject vehicle is smaller in the detection result of the travel state detection sensor 110 than in the measurement result of the GPS unit 130 until a certain time passes (e.g. until time t1 of FIG. 8B passes), as illustrated in FIG. 8B, because the detection accuracy of the position of the subject vehicle is higher in the detection result of the travel state detection sensor 110 than in the measurement result of the GPS unit 130. Thus, when the determination result of the position of the subject vehicle based on the detection result of the travel state detection sensor 110 and the determination result of the position of the subject vehicle based on the measurement result of the GPS unit 130 are different, the position at which the subject vehicle travels can be appropriately estimated until the certain time passes (e.g. until time t1 of FIG. 8B passes) using the detection result of the travel state detection sensor 110, in which an error is less likely occur, rather than using the measurement result of the GPS unit 130, in which an error may readily occur. A process of taking into account the case in which a certain time passes will be described in the second embodiment.

Furthermore, in the first embodiment, the average value of distances between the travel trajectory of the subject vehicle and the lane boundary line is calculated. When the average value is less than a predetermined value, the first embodiment determines that the subject vehicle gets across the lane boundary line (without determining that the GPS estimation position gets across the lane boundary line due to the measurement error in the GPS unit 130), and the GPS estimation position is estimated as the current position of the subject vehicle. That is, when determining that the subject vehicle gets across the lane boundary line, the GPS estimation position is estimated as the current position of the subject vehicle without determining whether or not the determination result of the positional relationship between the odometry estimation position and the lane boundary line and the determination result of the positional relationship between the GPS estimation position and the lane boundary line are identical. Through this operation, even in a scene in which the position of the subject vehicle cannot be stably estimated using the positional relationship between the position of the subject vehicle and the lane boundary line because the subject vehicle actually gets across the lane boundary line, the GPS estimation position can be estimated as the current position of the subject vehicle thereby to stably estimate the position of the subject vehicle. In addition, in the present embodiment, the average value of distances between the travel trajectory of the subject vehicle and the lane boundary line is used to determine whether or not the subject vehicle continuously gets across the lane boundary line, and it is possible to appropriately determine that whether or not the subject vehicle gets across the lane boundary line.

《Second Embodiment》

Next, the travel control apparatus according to a second embodiment of the present invention will be described. The travel control apparatus 100 according to the second embodiment has the same configuration as that of the travel control apparatus 100 according to the first embodiment and operates in the same manner as in the first embodiment except that the travel control apparatus 100 operates as described below.

The control device 170 according to the second embodiment has a modified subject vehicle position determination function as compared with the function in the first embodiment. That is, in the case in which the process of estimating the odometry estimation position as the current position of the subject vehicle is sequentially performed a predetermined number of times or more because the determination result obtained by determining whether or not the position of the subject vehicle gets across the lane boundary line on the basis of the detection result of the travel state detection sensor 110 and the determination result obtained by determining whether or not the position of the subject vehicle gets across the lane boundary line on the basis of the measurement result of the GPS unit 130 are not identical, even when the above determination results are not identical, the GPS estimation position is estimated as the current position of the subject vehicle. The reason is as follows. When the position of the subject vehicle is estimated on the basis of the detection result of the travel state detection sensor 110, errors are accumulated as time passes, as illustrated in FIG. 8B, and the error tends to increase in the position of the subject vehicle based on the detection result of the travel state detection sensor 110. When the process of estimating the odometry estimation position as the current position of the subject vehicle is sequentially performed a predetermined number of times or more, therefore, the GPS estimation position is estimated as the current position of the subject vehicle, and the error in the estimated position of the subject vehicle can thereby be suppressed.

The travel control process according to the second embodiment will then be described. The travel control process according to the second embodiment is the same as the travel control process according to the first embodiment except that the process illustrated in FIGS. 7A-7C is performed as substitute for the process illustrated in FIG. 3. In the following description, therefore, the process illustrated in FIGS. 7A-7C will be described and the description of the process illustrated in FIG. 2 will be omitted.

In the second embodiment, as in the first embodiment, as illustrated in FIGS. 7B and 7C, the odometry determination line and the GPS determination line are generated (step S111), and the positional relationship between the odometry determination line and the lane boundary line and the positional relationship between the GPS determination line and the lane boundary line are determined (step S112). Then, when the determination result of the positional relationship between the odometry determination line and the lane boundary line and determination result of the positional relationship between the GPS determination line and the lane boundary line are identical (step S113=Yes), the GPS estimation position is estimated as the current position of the subject vehicle (step S115).

On the other hand, when, in step S113, when the determination result of the positional relationship between the odometry determination line and the lane boundary line and the determination result of the positional relationship between the GPS determination line and the lane boundary line are not identical, the routine proceeds to step S201. In step S201, the subject vehicle position determination function is executed to determine whether or not the number of times K that the process (process of step S114) of estimating the odometry estimation position based on the detection result of the travel state detection sensor 110 as the position of the subject vehicle is sequentially performed is a predetermined number of times S or more.

When the number of times K of sequential execution is less than the predetermined number of times S, the routine proceeds to step S114 in which the odometry estimation position based on the detection result of the travel state detection sensor 110 is estimated as the current position of the subject vehicle. Then, in step S202, the subject vehicle position determination function is executed to perform a process of incrementing K by one.

On the other hand, when the number of times K of sequential execution is the predetermined number of times S or more, the routine proceeds to step S115 in which the GPS estimation position based on the measurement result of the GPS unit 130 is estimated as the current position of the subject vehicle. Then, in step S203, the subject vehicle position determination function is executed to perform a process of resetting the number of times K of sequential execution to zero.

As described above, in the second embodiment, when the determination result of the positional relationship between the odometry determination line and the lane boundary line and the determination result of the positional relationship between the GPS determination line and the lane boundary line are not identical and therefore the number of times K that the odometry estimation position based on the detection result of the travel state detection sensor 110 is sequentially estimated as the position of the subject vehicle becomes the predetermined number of times S or more, the odometry estimation position is no longer estimated as the current position of the subject vehicle, and the GPS estimation position based on the measurement result of the GPS unit 130 is estimated as the current position of the subject vehicle. Through this operation of the second embodiment, it is possible to effectively suppress the error of the estimated position of the subject vehicle due to sequentially estimating the odometry estimation position based on the detection result of the travel state detection sensor 110 as the current position of the subject vehicle.

This will be more specifically described. When the position of the subject vehicle is estimated on the basis of the detection result of the travel state detection sensor 110, the current position of the subject vehicle is estimated by adding the moving amount ($\Delta x$, $\Delta y$) moved from the previous position of the subject vehicle to the previously-estimated position of the subject vehicle. Accordingly, as illustrated in FIG. 8B, errors are accumulated as time passes and the error tends to increase in the position of the subject vehicle based only on the detection result of the travel state detection sensor 110. When the odometry estimation position based on the detection result of the travel state detection sensor 110 is to be sequentially estimated a predetermined number of times or more as the current position of the subject vehicle, therefore, the GPS estimation position is estimated as the current position of the subject vehicle thereby to allow the next process to be performed such that an odometry estimation position is newly estimated on the basis of the currently-estimated GPS estimation position. Accumulation of errors is thus suppressed in the odometry estimation position, and the position of the subject vehicle can be more appropriately estimated in the next process and subsequent processes.

Embodiments heretofore explained are described to facilitate understanding of the present invention and are not described to limit the present invention. It is therefore intended that the elements disclosed in the above embodiments include all design changes and equivalents to fall within the technical scope of the present invention.

For example, in the above-described one or more embodiments of the present invention, a configuration is exemplified in which a determination is made whether the odometry estimation position and the GPS estimation position are within the same lane by determining whether the odometry estimation position based on the detection result of the travel state detection sensor 110 gets across the lane boundary line and whether the GPS estimation position based on the measurement result of the GPS unit 130 gets across the lane boundary line, but the present invention is not limited to this configuration and another configuration can also be employed in which a determination is made whether the odometry estimation position and the GPS estimation position are within the same lane, for example, on the basis of the positional relationship between the odometry estimation position and the lane boundary line and the positional relationship between the GPS estimation position and the lane boundary line (e.g. whether the odometry estimation position or the GPS estimation position is located at the right side than the right-side lane boundary line).

In the above-described one or more embodiments of the present invention, a configuration is exemplified for determining that the subject vehicle actually gets across the lane boundary line when the average value of distances from the trajectory of the subject vehicle to the lane boundary line is less than a predetermined value, but the present invention is not limited to this configuration and another configuration can also be employed in which, for example, the distance from the trajectory of the subject vehicle to the lane boundary line is repeatedly detected and a determination is made that the subject vehicle gets across the lane boundary line when the distance from the trajectory of the subject vehicle to the lane boundary line becomes less than a predetermined value.

In the above-described second embodiment, a configuration is exemplified in which the GPS estimation position based on the measurement result of the GPS unit 130 is estimated as the current position of the subject vehicle when the number of times K that the odometry estimation position is sequentially estimated as the current position of the subject vehicle becomes the predetermined number of times S or more, but the present invention is not limited to this configuration and another configuration can also be employed in which the GPS estimation position based on the measurement result of the GPS unit 130 is estimated as the current position of the subject vehicle, for example, when the time during which the odometry estimation position is sequentially estimated as the current position of the subject vehicle becomes a predetermined time or more or when the travel distance in which the odometry estimation position is sequentially estimated as the current position of the subject vehicle becomes a predetermined distance or more.

In the above-described one or more embodiments of the present invention, the GPS unit 130 corresponds to the receiver of the present invention, the travel state detection sensor 110 corresponds to the first detector of the present invention, the surrounding situation detection sensor 120 corresponds to the second detector of the present invention, and the travel control apparatus 100 corresponds to the travel control apparatus of the present invention.

REFERENCE SIGNS LIST

100 Travel control apparatus
110 Travel state detection sensor
120 Surrounding situation detection sensor
130 GPS unit
140 Map database
150 Presentation device
160 Drive control device
170 Control device

The invention claimed is:

1. A travel control method executed by a travel control apparatus, the method comprising:
   receiving GPS positional information of a subject vehicle from an external device using a GPS receiver;
   detecting with a first detector equipped in the subject vehicle a state of the subject vehicle;
   detecting with a second detector a situation around the subject vehicle;
   measuring a measured position of the subject vehicle based on the GPS positional information;
   estimating an estimated position of the subject vehicle on a basis of a detection result of the first detector;
   detecting a lane in which the subject vehicle travels, on a basis of a detection result of the second detector;
   performing a first determination process to determine when the subject vehicle located at the measured position is included in the lane and outputting a first determination result obtained by the first determination process;
   performing a second determination process to determine when the subject vehicle located at the estimated position is included in the lane and outputting a second determination result obtained by the second determination process; and
   performing an odometry position estimation process of estimating the position of the subject vehicle on the basis of the detection result of the first detector when the first determination result and the second determination result are not identical.

2. The travel control method according to claim 1, further comprising estimating the position of the subject vehicle on a basis of the GPS positional information when the first determination result and the second determination result are identical.

3. The travel control method according to claim 1, further comprising:
   estimating the position of the subject vehicle without using the GPS positional information after determining that the first determination result and the second determination result are not identical.

4. The travel control method according to claim 1, further comprising:
   detecting a boundary line of the lane in which the subject vehicle travel, on the basis of the detection result of the second detector;
   determining that the subject vehicle located at the measured position is not included in the lane when the subject vehicle located at the measured position moves across the boundary line of the lane; and
   determining that the subject vehicle located at the estimated position is not included in the lane when the subject vehicle located at the measured position moves across the boundary line of the lane.

5. The travel control method according to claim 4, further comprising determining whether or not to perform the odometry position estimation process on a basis of a distance between a travel trajectory of the subject vehicle and the boundary line of the lane.

6. The travel control method according to claim 5, further comprising determining not to perform the odometry position estimation process when an average value of distances from the travel trajectory of the subject vehicle to the boundary line of the lane is less than a predetermined value.

7. The travel control method according to claim 1, further comprising:

estimating the position of the subject vehicle on a basis of the GPS positional information as substitute for the detection result of the first detector when the first determination result and the second determination result are not identical and the process of estimating the position of the subject vehicle on the basis of the detection result of the first detector is repeatedly performed during a certain period or more that is represented by a predetermined number of times, a predetermined time, or a predetermined travel distance.

8. A travel control apparatus, comprising:
a GPS receiver receiving GPS positional information of a subject vehicle from an external device;
a first detector equipped in the subject vehicle and detecting a state of the subject vehicle;
a second detector detecting a situation around the subject vehicle; and
a controller configured to estimate a position of the subject vehicle, the controller configured to:
  measure the measured position of the subject vehicle based on the GPS positional information;
  estimate an estimated position of the subject vehicle on a basis of a detection result of the first detector;
  detect a lane in which the subject vehicle travels, on a basis of a detection result of the second detector;
  perform a first determination process to determine when the subject vehicle located at the measured position is included in the lane and output a first determination result obtained by the first determination process;
  perform a second determination process to determine when the subject vehicle at the estimated position is included in the lane and output a second determination result obtained by the second determination process; and
  estimate the position of the subject vehicle using an odometry position estimation process on the basis of the detection result of the first detector when the first determination result and the second determination result are not identical.

* * * * *